(12) United States Patent
Chilton

(10) Patent No.: US 8,793,930 B2
(45) Date of Patent: Aug. 5, 2014

(54) DRY CHAMBER SLUG AND SNAIL BARRIER

(76) Inventor: Robert P. Chilton, Salt Lake City, UT (US)

( * ) Notice: Subject to any disclaimer, the term of this patent is extended or adjusted under 35 U.S.C. 154(b) by 255 days.

(21) Appl. No.: 13/292,805

(22) Filed: Nov. 9, 2011

(65) Prior Publication Data

US 2013/0111803 A1 May 9, 2013

(51) Int. Cl.
*A01M 25/00* (2006.01)

(52) U.S. Cl.
USPC .................................. 43/131; 43/58

(58) Field of Classification Search
USPC .............. 43/58, 107, 108, 121, 131
See application file for complete search history.

(56) References Cited

U.S. PATENT DOCUMENTS

| | | | | |
|---|---|---|---|---|
| 1,373,827 A | * | 4/1921 | Nelson et al. | 43/107 |
| 4,319,423 A | * | 3/1982 | Judd | 43/121 |
| 4,566,219 A | * | 1/1986 | Firth | 43/107 |
| 5,170,584 A | * | 12/1992 | Perry | 43/124 |
| 5,175,958 A | * | 1/1993 | Wedemeyer | 43/121 |
| 5,274,950 A | * | 1/1994 | Roberts | 43/121 |
| 5,390,441 A | * | 2/1995 | Pence | 43/131 |
| 6,230,435 B1 | * | 5/2001 | Carman | 43/108 |
| 6,691,454 B1 | * | 2/2004 | Conroy | 43/132.1 |
| 7,434,788 B2 | * | 10/2008 | Foster | 43/112 |
| 7,647,723 B2 | * | 1/2010 | Klein et al. | 43/132.1 |

\* cited by examiner

*Primary Examiner* — Kimberly Berona
*Assistant Examiner* — Marc Burgess
(74) *Attorney, Agent, or Firm* — Stoel Rives LLP

(57) ABSTRACT

This disclosure relates to systems and methods for providing a barrier that minimizes or prevents mollusks, such as slugs and snails, from entering a garden or other vegetation area. A barrier may include a dry chamber in an inverted U-shaped area configured to retain rock salt or other mollusk deterrent. Mesh may be used to retain the deterrent within the inverted U-shaped dry chamber. In various embodiments, a bead or other feature may help prevent liquids, such as water, from entering the dry chamber.

1 Claim, 2 Drawing Sheets

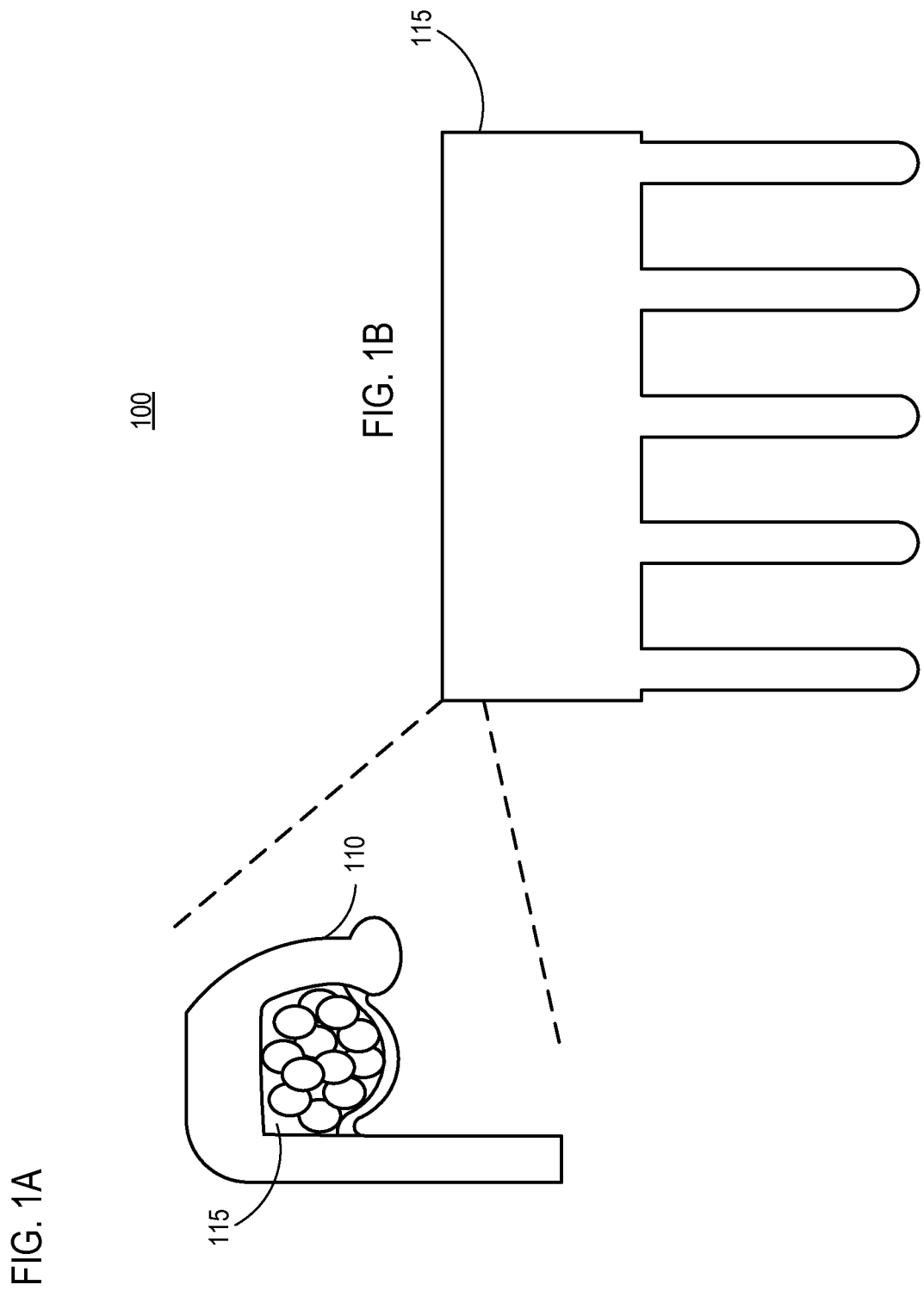

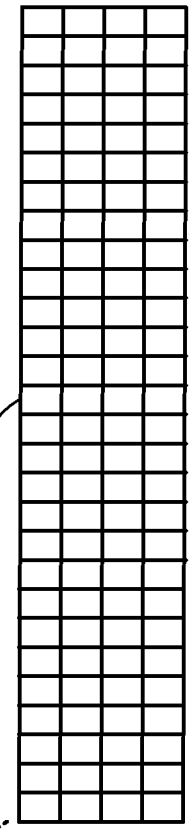
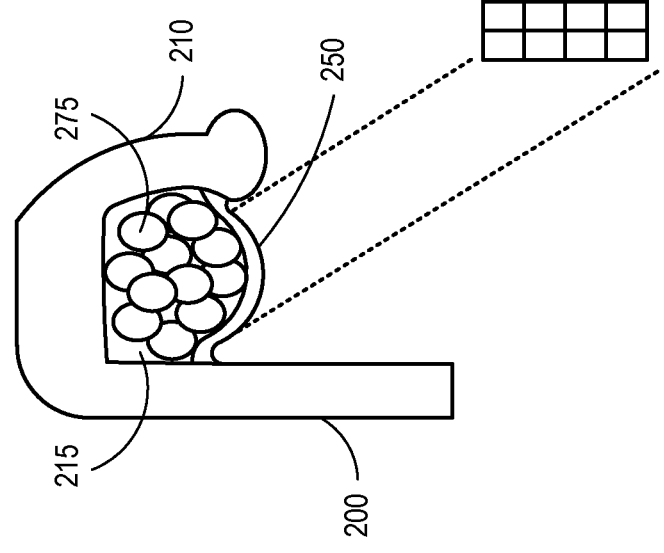

DRY CHAMBER SLUG AND SNAIL BARRIER

FIELD OF DISCLOSURE

The present disclosure relates to systems and methods for minimizing mollusk damage to horticultural and gardening foliage.

BACKGROUND

The barrier described in Conroy U.S. Pat. No. 6,691,454 states, "A channel member formed at the upper edge holds a length of wicking material. The wicking material can be a compressed flat synthetic sponge." The documentation to Conroy U.S. Pat. No. 6,691,454 further states, "The system of this invention takes advantage of this fact, and dispenses salt though an absorbent porous wicking material.
Each time it rains and whenever the garden is watered, the wicking material becomes wet and draws more of the salt to the upper part of the barrier."

Foster U.S. Pat. No. 7,434,788 ("Foster") does state "a pest deterrent fence is used to deter slugs and snails and similar animals from gaining access to gardens." The "Foster" fence does incorporate conductive surfaces for an electric current that are separated by a T shaped dielectric dimensioned to prevent moisture from connecting the first and second conductive surfaces by promoting beading and dripping. In the case of Foster, the dielectric is dimensioned to promote beading and dripping. The purpose is to prevent moisture from connecting the first and second conductive surfaces.

SUMMARY

The present systems and methods provide a barrier that deters slugs and snails from damaging foliage. The barrier is referred to herein as a Dry Chamber Slug and Snail Barrier. The barrier may be made entirely of post-consumer recycled plastic in multiple lengths, thicknesses, and depths.

Along the entire top edge of the barrier exists an inverted "u" shaped chamber that serves as the dry staging area for the slug and snail deterrent or bait. The underside of the Dry Chamber is made of netted mesh, such as a plastic netted mesh.

Notwithstanding the fact that some types of existing snail and slug bait are produced in a fashion to reduce such bait from breaking down or becoming saturated from garden watering or from rainfall the life of slug and snail bait is, nonetheless, shortened by regular watering.

The dry staging area of the Dry Chamber Slug and Snail Barrier substantially enhances the life of such bait by reducing exposure to garden watering, horticultural watering, or rainfall.

It is an established fact that, owing to osmosis, contact with sodium chloride does directly lead to dehydration of both slugs and snails.

With respect to sodium chloride as a deterrent—history has established an additional fact that soil salinity does impact plant growth, to a negative effect, when levels of salinity exceed certain bounds. Sodium chloride leaching into the soil is exacerbated when salt, in any form, within a garden or horticultural environment is exposed to watering or to rainfall.

For this reason, it generally is held that sodium chloride, in the form of salt, should not be used as a deterrent for garden or horticultural mollusks.

In a trial case that the inventor conducted, the rock salt contained within a mocked-up dry chamber was still in place, virtually untouched by moisture, a month after being placed into the Inventor's garden.

Furthermore, the broad leaf Hosta plants within the protected area suffered relatively little to no mollusk damage compared to the same types of plants within the same garden and not within a protected area. Incidentally, it also is an established fact the Hosta plants are a highly-desired-by mollusk food source.

BRIEF DESCRIPTION OF THE DRAWINGS

Non-limiting and non-exhaustive embodiments of the disclosure are described, including various embodiments of the disclosure with reference to the figures, in which:

FIG. 1A illustrates one embodiment of a cut-away side view of a Dry Chamber Slug and Snail Barrier.

FIG. 1B illustrates one embodiment of a front view of the Dry Chamber Slug and Snail Barrier.

FIG. 2A illustrates the cut-away side view of the Dry Chamber Slug and Snail Barrier.

FIG. 2B illustrates one embodiment of a surface view of a mesh retainer.

DETAILED DESCRIPTION

The present systems and methods provide a barrier that deters slugs and snails from damaging foliage. The barrier is referred to herein as a Dry Chamber Slug and Snail Barrier. The barrier may be made using post-consumer recycled plastic in multiple lengths, thicknesses, and depths. Along the entire top edge of the barrier exists an inverted "u" shaped chamber that serves as the dry staging area for the slug and snail deterrent or bait. The underside of the Dry Chamber is made of netted mesh, such as a plastic netted mesh.

The drawings reflect only one size option and configuration. The Barrier size is adaptable based on the subject need. The Barrier includes a Dry Chamber of an appropriate size based on the size of the barrier.

The Dry Chamber is able to accommodate a variety of deterrents or baits. All drawings within this specification illustrate rock salt as the deterrent, even though other deterrents and/or baits are possible.

As illustrated in FIGS. 1A and 1B, a Dry Chamber Slug and Snail Barrier 100 may include a front side 110 that faces outward and away from protected plants or protected area. A rock salt storage and staging chamber (the "Dry Chamber") 115 runs the length of the Barrier. FIG. 1A, the width of Dry Chamber 115, from inside wall to inside wall may be approximately ½". The Mesh, however, may be convexly curved and therefore have a width of approximately 1 inch. Each end of the Dry Chamber may have a snap-on cap (not pictured) to retain rock salt within the Dry Chamber.

Although not required, 100% of the Barrier, including the entire Dry Chamber and Mesh, may be made of postconsumer recycled plastic, or any other suitable material. In various embodiments, including the illustrated embodiments, the Barrier has a uniform thickness of ⅛". It will be appreciated that the various sizes, thicknesses, shapes, widths, and/or materials described herein may be modified without departing from the scope of the presently described systems and methods.

FIG. 2A illustrates a Dry Chamber Slug and Snail Barrier 200 with a front side 210 that faces outward and away from protected plants or protected area. A rock salt storage and staging chamber (the "Dry Chamber") 215 runs the length of the Barrier. As illustrated in FIG. 2B, mesh 250 is located at the bottom of and runs the entire length of the Dry Chamber 215.

The Mesh 250 spans both the width and the entire length of the under part of the Dry Chamber 215. The Mesh 250 and all parts of the Barrier 200 may be produced as a single molded unit. Aside from the snap-on caps (not pictured) at both ends of the Chamber 215, the Barrier 200 contains no moving parts. The Dry Chamber 215 and Mesh 250, combined:

Provide a dry staging, at 215, area for slug and snail deterrent or bait, such as salt 275

Substantially reduce the risk of sodium chloride 275 leaching into gardening or horticultural soil from the Dry Chamber 215 should rock salt 275 serve as the deterrent.

The Mesh 250:

Serves as the length-wise section of the Barrier 200 that each slug and snail must navigate to gain entrance into the protected gardening or horticultural area. The Mesh of a Dry Chamber adequately filled with rock salt 275 will expose the mollusk to some level of sodium chloride 275. Such exposure will cause the water to leave the mollusk body owing to osmosis; sufficient exposure will lead to complete dehydration.

The Dry Chamber Slug and Snail Barrier 200 creates a barrier that deters slugs and snails from damaging foliage—gardening or horticultural—considered a mollusk food source.

The Dry Chamber Slug and Snail Barrier may be made of plastic and may be manufactured into multiple lengths, thicknesses, and depths of an earth-tone color.

With this said, FIGS. 1A-2B illustrate one embodiment within a home gardening environment.

FIGS. 1A-2B reflect a twelve-inch section of barrier. The embodiment(s) for either horticultural use of home gardening use envisions multiple sections being aligned to encircle the area to be protected from slugs and snails.

Not pictured in the drawings are plastic caps that may be used to hold separate lengths of pieces of the barrier together.

Additionally, FIGS. 1A-2B illustrate only a straight section of barrier. To effectively accommodate bends and curves, the Dry Chamber Slug and Snail Barrier may be pre-cast with appropriate curvature.

The Dry Chamber is capable of staging a variety of deterrents and baits, for either gardening or horticultural use.

Although not reflected in FIGS. 1A-2B, plastic plugs located at either end of the Dry Chamber are removed so that the rock salt (or any other bait or deterrent) may be simply poured in to the Dry Chamber. The plug is then repositioned on the end of the barrier from which it was removed.

Additionally, the Dry Chamber may be molded in a fashion to minimize exposing the rock salt (or any other bait or deterrent) to moisture such as that from garden watering, horticultural watering and from rain; this design extends the life of the rock salt (or any other bait or deterrent) and substantially reduces sodium chloride leaching into the garden soil. Soil salinity may be detrimental to gardening foliage.

Slugs and snails must navigate the mesh located at the bottom of the Dry Chamber to enter into the protected area thus becoming exposed to sodium chloride in the form of rock salt. Such contact will cause water to leave the mollusk body owing to osmosis and likely would lead to complete dehydration. At a minimum, the mollusk will be deterred from attempting to navigate the Mesh.

What is claimed is:

1. A slug and snail barrier deterrent comprising:
    an elongated barrier adapted to extend along a designated area for protection from snails and slugs;
    a plurality of stakes integral with and dependent downwardly from said elongated barrier for insertion into the ground;
    said barrier comprising an outwardly extending and downwardly depending portion creating a dry chamber located opposite said plurality of stakes;
    said downwardly depending portion terminating in a moisture diverter running along the length of said barrier;
    said dry chamber providing for the receiving of a slug and snail deterrent;
    said deterrent comprising rock salt wherein said rock salt is retained within said dry chamber by a plastic mesh running along the length of said barrier so as to suspend said rock salt above the ground;
    said plastic mesh being mounted above said moisture diverter such that water running from the downwardly depending portion does not wick into said dry chamber; and
    said mesh being of an appropriate size to retain the rock salt within the containment area while being of sufficient size to expose the slugs and snails to the deterrent.

* * * * *